(12) United States Patent
Cope et al.

(10) Patent No.: US 11,776,504 B2
(45) Date of Patent: *Oct. 3, 2023

(54) IN-SITU DISPLAY MONITORING AND CALIBRATION SYSTEM AND METHODS

(71) Applicant: Nanolumens Acquisition, Inc., Peachtree Corners, GA (US)

(72) Inventors: Richard C. Cope, Duluth, GA (US); Theodore Heske, III, Suwanee, GA (US)

(73) Assignee: Nanolumens Acquisition, Inc., Peachtree Corners, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/555,322

(22) Filed: Dec. 17, 2021

(65) Prior Publication Data

US 2022/0189421 A1 Jun. 16, 2022

Related U.S. Application Data

(63) Continuation of application No. 16/983,283, filed on Aug. 3, 2020, now Pat. No. 11,211,017, which is a
(Continued)

(51) Int. Cl.
*G09G 5/10* (2006.01)
*G09G 5/02* (2006.01)
(Continued)

(52) U.S. Cl.
CPC .............. *G09G 5/10* (2013.01); *G06V 10/60* (2022.01); *G09G 3/002* (2013.01); *G09G 3/3413* (2013.01);
(Continued)

(58) Field of Classification Search
None
See application file for complete search history.

(56) References Cited

U.S. PATENT DOCUMENTS 5,747,928 A 5/1998 Shanks et al.
6,332,690 B1 12/2001 Murofishi
(Continued)

*Primary Examiner* — Saptarshi Mazumder
(74) *Attorney, Agent, or Firm* — TROUTMAN PEPPER HAMILTON SANDERS LLP; James E. Schutz; Jacob M. Burr

(57) ABSTRACT

Disclosed are embodiments of in-situ display monitoring and calibration systems and methods. An image acquisition system captures images of the viewing plane of the display. Captured images may then be processed to characterize various visual performance characteristics of the display. When not in use capturing images of the display, the image acquisition system can be stored in a manner that protects it from environmental hazards such as dust, dirt, precipitation, direct sunlight, etc. A calibration image in which a plurality of light emitting elements is set to a particular color and intensity may be displayed, an image then captured, and then a difference between what was expected and what was captured may be developed for each light emitting element. Differences between captured images and expected images may be used to create a calibration data set which then may be used to adjust the display of further images upon the display.

19 Claims, 9 Drawing Sheets

Related U.S. Application Data continuation of application No. 16/245,792, filed on Jan. 11, 2019, now Pat. No. 10,733,943, which is a continuation of application No. 15/459,089, filed on Mar. 15, 2017, now Pat. No. 10,217,440.

(60) Provisional application No. 62/309,739, filed on Mar. 17, 2016.

(51) Int. Cl.
  *G06V 10/60* (2022.01)
  *G09G 3/00* (2006.01)
  *G09G 3/34* (2006.01)

(52) U.S. Cl.
  CPC .......... *G09G 5/02* (2013.01); *G09G 2320/04* (2013.01); *G09G 2320/0626* (2013.01); *G09G 2320/0666* (2013.01); *G09G 2320/0693* (2013.01); *G09G 2330/12* (2013.01); *G09G 2360/145* (2013.01)

(56) References Cited

U.S. PATENT DOCUMENTS

| | | | |
|---|---|---|---|
| 6,819,045 B2 | 11/2004 | Okita et al. | |
| 6,974,971 B2 | 12/2005 | Young | |
| 7,242,398 B2 | 7/2007 | Nathan et al. | |
| 7,636,085 B2 | 12/2009 | Yang | |
| 7,710,370 B2 | 5/2010 | Slikkerveer et al. | |
| 7,714,801 B2 | 5/2010 | Kimmel | |
| 7,825,582 B2 | 11/2010 | Furukawa et al. | |
| 7,834,537 B2 | 11/2010 | Kee et al. | |
| 7,834,962 B2 | 11/2010 | Satake et al. | |
| 7,868,545 B2 | 1/2011 | Hioki et al. | |
| 7,977,170 B2 | 7/2011 | Tredwell et al. | |
| 7,999,760 B2 * | 8/2011 | Giegold | G06T 5/006 345/9 |
| 8,023,060 B2 | 9/2011 | Lin et al. | |
| 8,096,068 B2 | 1/2012 | Van Rens | |
| 8,097,812 B2 | 1/2012 | Wang et al. | |
| 8,098,486 B2 | 1/2012 | Hsiao et al. | |
| 8,228,667 B2 | 7/2012 | Ma | |
| 8,284,369 B2 | 10/2012 | Chida et al. | |
| 8,319,725 B2 | 11/2012 | Okamoto et al. | |
| 8,334,926 B2 * | 12/2012 | Nanu | G03B 19/023 348/370 |
| 8,456,078 B2 | 6/2013 | Hashimoto | |
| 8,471,995 B2 | 6/2013 | Tseng et al. | |
| 8,477,464 B2 | 7/2013 | Visser et al. | |
| 8,493,520 B2 | 7/2013 | Gay et al. | |
| 8,493,726 B2 | 7/2013 | Visser et al. | |
| 8,654,519 B2 | 2/2014 | Visser et al. | |
| 8,780,039 B2 | 7/2014 | Gay et al. | |
| 8,816,977 B2 | 8/2014 | Rothkopf et al. | |
| 8,873,225 B2 | 10/2014 | Huitema et al. | |
| 8,963,895 B2 | 2/2015 | Cope et al. | |
| 8,982,545 B2 | 3/2015 | Kim et al. | |
| 9,013,367 B2 | 4/2015 | Cope | |
| 9,058,755 B2 | 6/2015 | Cope et al. | |
| 9,071,809 B2 | 6/2015 | Cope et al. | |
| 9,117,384 B2 | 8/2015 | Phillips et al. | |
| 9,159,707 B2 | 10/2015 | Cope | |
| 9,176,535 B2 | 11/2015 | Bohn et al. | |
| 9,279,573 B1 | 3/2016 | Perez-Bravo et al. | |
| 9,286,812 B2 | 3/2016 | Bohn et al. | |
| 9,326,620 B1 | 5/2016 | Cross et al. | |
| 9,330,589 B2 | 5/2016 | Cope et al. | |
| 9,335,793 B2 | 5/2016 | Rothkopf | |
| 9,372,508 B2 | 6/2016 | Wang | |
| 9,404,644 B1 | 8/2016 | Perez-Bravo et al. | |
| 9,435,518 B2 | 9/2016 | Cope et al. | |
| 9,445,044 B1 | 9/2016 | Cope et al. | |
| 9,459,656 B2 | 10/2016 | Shai | |
| 9,535,649 B2 | 1/2017 | Cope et al. | |
| 2002/0190921 A1 * | 12/2002 | Hilton | H04N 13/395 348/E13.057 |
| 2006/0098153 A1 | 5/2006 | Slikkerveer et al. | |
| 2006/0204675 A1 | 9/2006 | Gao et al. | |
| 2007/0241002 A1 | 10/2007 | Wu et al. | |
| 2008/0042940 A1 | 2/2008 | Hasegawa | |
| 2008/0218369 A1 | 9/2008 | Krans et al. | |
| 2009/0189917 A1 | 7/2009 | Benko et al. | |
| 2010/0245396 A1 | 9/2010 | Huang et al. | |
| 2011/0134144 A1 | 6/2011 | Moriwaki | |
| 2012/0002360 A1 | 1/2012 | Seo et al. | |
| 2012/0092363 A1 | 4/2012 | Kim et al. | |
| 2012/0098976 A1 | 4/2012 | Matsushita et al. | |
| 2012/0313862 A1 | 12/2012 | Ko et al. | |
| 2013/0100392 A1 | 4/2013 | Fukushima | |
| 2014/0194683 A1 * | 7/2014 | Nakaguchi | A61B 17/29 600/109 |
| 2016/0150223 A1 * | 5/2016 | Hwang | H04N 13/324 348/51 |
| 2018/0077354 A1 * | 3/2018 | Ikeda | H04N 5/23254 |

* cited by examiner

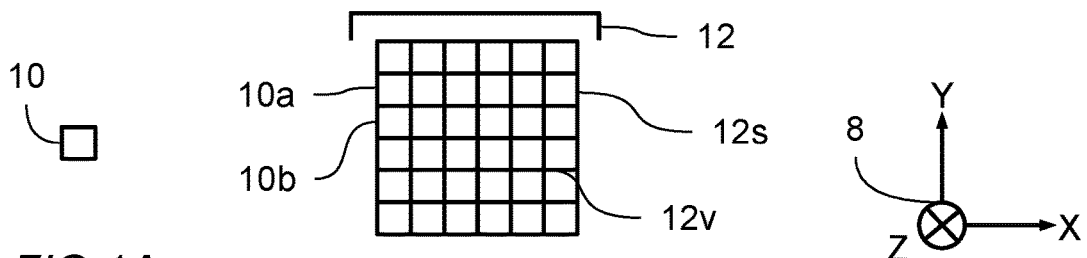
FIG 1A  FIG 1B
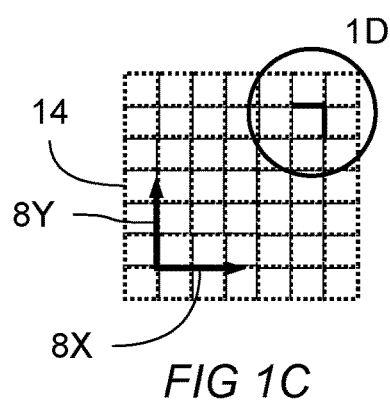 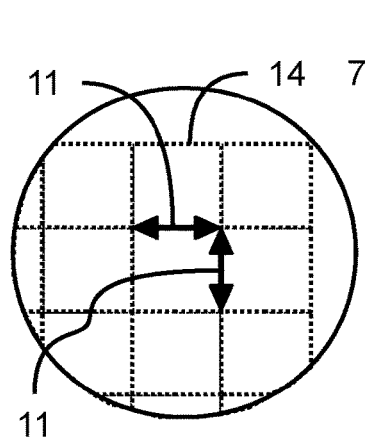 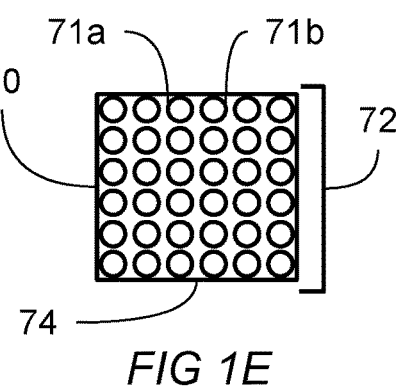
FIG 1C  FIG 1D  FIG 1E
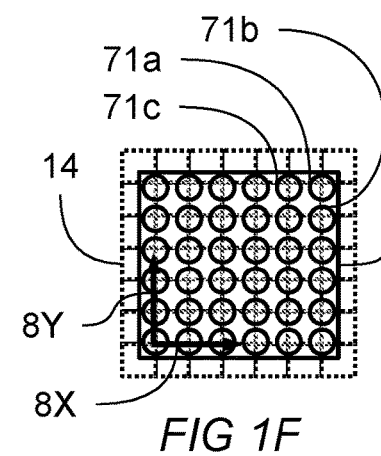 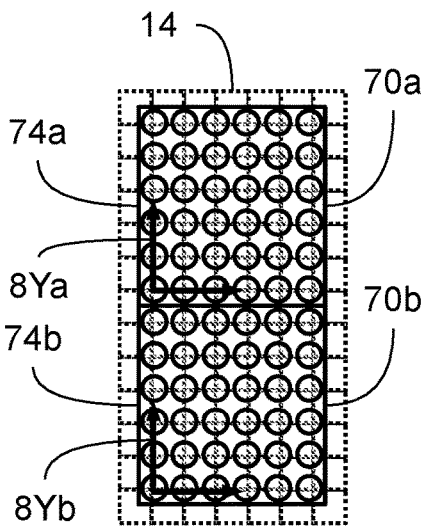
FIG 1F  FIG 1G
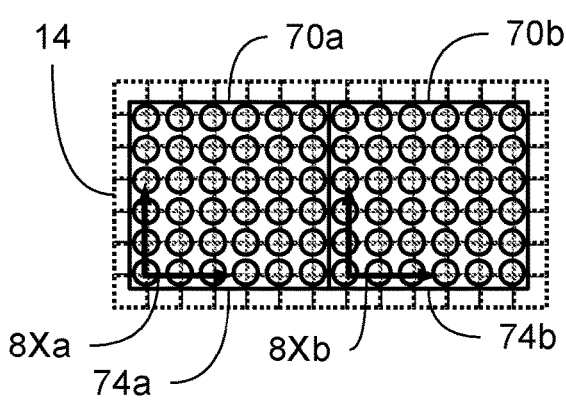
FIG 1H

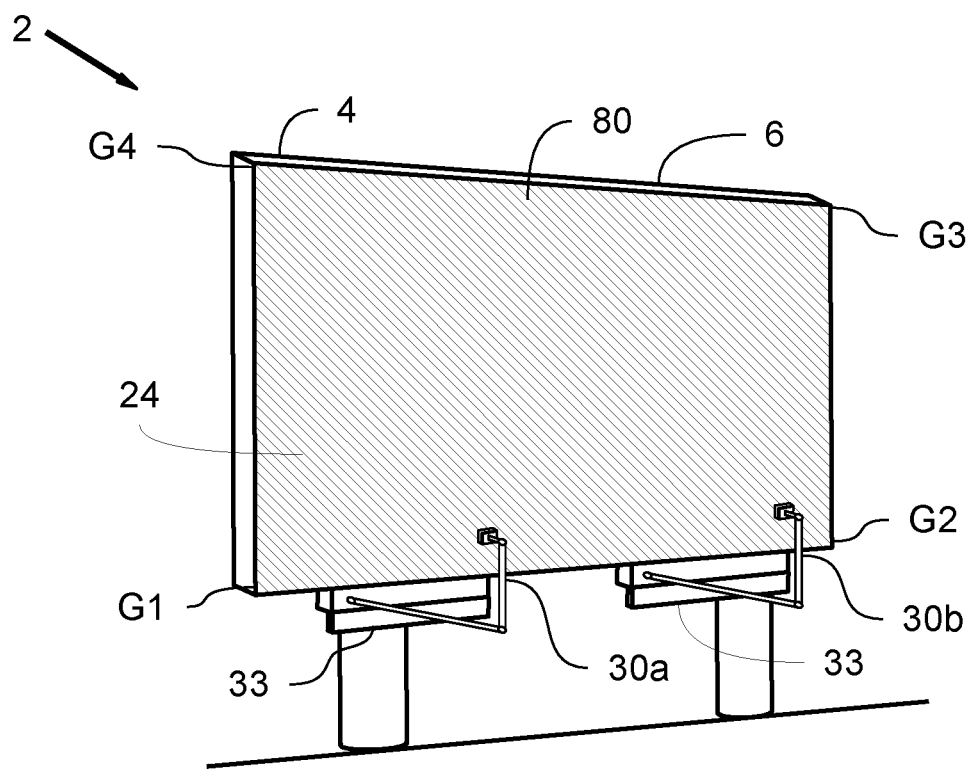
*FIG 10A*
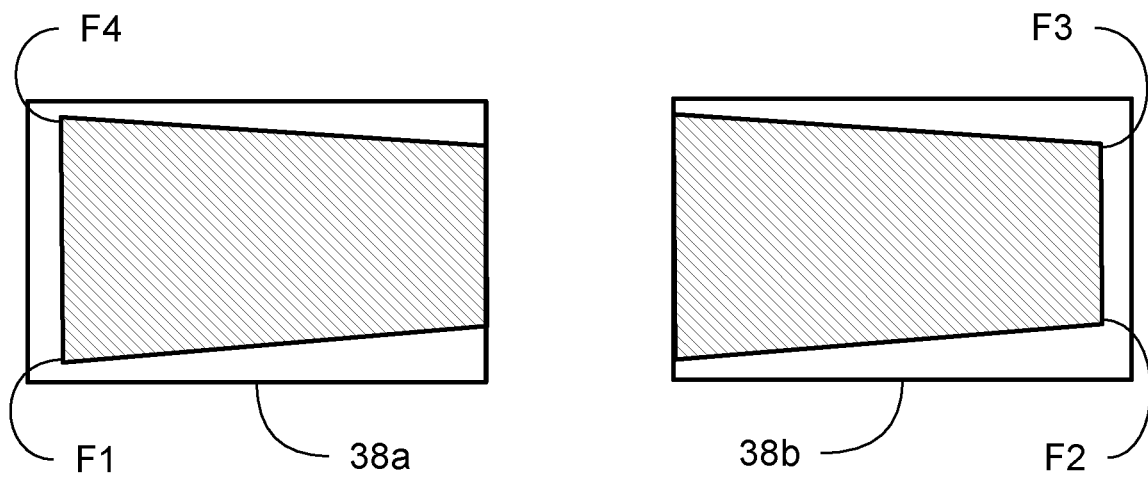
*FIG 10B*  *FIG 10C*

IN-SITU DISPLAY MONITORING AND CALIBRATION SYSTEM AND METHODS

CROSS REFERENCE TO RELATED APPLICATIONS

This non-provisional utility application claims the benefit of and is a continuation of application Ser. No. 16/983,283, filed Aug. 3, 2020 and entitled "In-Situ Display Monitoring and Calibration System and Methods". Application Ser. No. 16/983,283 claimed the benefit of and is a continuation of application Ser. No. 16/245,792, filed Jan. 11, 2019 and entitled "In-Situ Display Monitoring and Calibration System and Methods". Application Ser. No. 16/245,792 claimed the benefit of and is a continuation of application Ser. No. 15/459,089, filed Mar. 15, 2017 and entitled "In-Situ Display Monitoring and Calibration System and Methods". Application Ser. No. 15/459,089 claimed the benefit of prior filed provisional application No. 62/309,739, filed Mar. 17, 2016 and entitled "In-Situ Display Monitoring and Calibration System and Methods". Application Ser. Nos. 16/983,283, 16/245,792, 15/459089 and 62/309739 are herein incorporated by reference.

BACKGROUND

The sense of sight is utterly compelling to those human beings who possess it. The adage that a picture is worth a thousand words resonates with an appreciation of the profound importance of taking in visual information. The sense of sight is unique in allowing us to absorb so much information from our world so quickly. It is natural then that advertisers, entertainers, artists, and others all want to engage people with their own visual content for the purpose creating a desired response in their intended audience. A large-scale visual display system is a particularly compelling way for people to experience the presentation of visual information and such systems are the focus of the present disclosure.

There are numerous features of a visual display system that contribute to its impact upon viewers including: size, brightness, contrast, color saturation, color depth, display refresh rate, resolution, pixel pitch, pixel pitch uniformity, and others.

There are numerous other features of a visual display system that are of interest to the owners and operators of such systems including: ease of installation, ease of service, reliability, ease of configuration, ease of maintenance, ease of operation, cost of the system, cost of installation, cost of operation, cost of service, and others.

Display systems with large screen sizes present a number of difficult problems that are in need of solution. One significant challenge for display owners and operators is to maintain the visual performance of a large display once it has been installed in a viewing location. The visual performance of a display can be characterized using a number of measures including uniformity of brightness across the entire display, uniformity of color across the entire display, contrast ratio, color temperature and uniformity of color temperature across the entire display, color fidelity to predetermined standards, etc.

Large displays may be built from a plurality of individual light emitting elements, arranged in a pre-determined pattern to create a composite viewing plane. Due to variances in manufactured materials and manufacturing processes, it is a fact of life that characteristics of individual light emitting devices vary from one device to the next and that individual devices may respond differently to environmental conditions of voltage, current, temperature, humidity, exposure to sun light, exposure to atmospheric gases such as ozone and nitrogen oxides, and aging. Variations in performance of individual light emitting elements include the characteristics of luminous intensity per light emitting element, luminous intensity produced per unit current, dominant wavelength of emitted light, wavelength distribution of emitted light, temperature coefficient of change of any of the prior parameters. Visual performance of the entire display is therefor subject to change as each and every light emitting element is exposed to the previously listed environmental factors and their variations over time.

In consideration of the foregoing points, it is clear that embodiments of the present disclosure confer numerous advantages and are therefore highly desirable.

SUMMARY

The present disclosure is directed to systems and methods for monitoring and calibrating display screens which comprise a plurality of display modules, each module having a plurality of light emitting elements, the plurality of display modules disposed to collectively provide a viewing plane. Other aspects of the disclosure are directed to systems and methods for monitoring and calibrating display screens which comprise a plurality of display modules, each module having a plurality of modulated reflective elements disposed to collectively provide a viewing plane.

Display systems of the present disclosure comprise a plurality of light emitting elements coupled to a substrate and arranged in a predetermined pattern collectively forming a viewing plane. Other display systems of the present disclosure may comprise a plurality of display modules assembled to make a large, unified, visual display in which each display module comprises a plurality of light emitting elements coupled to a substrate and arranged in a predetermined pattern with respect to a viewing plane. Each display module may be shaped so that it may abut one or more other display modules without introducing gaps or overlaps between adjacent display modules. The display systems disclosed create a highly uniform visual effect by creating highly uniform spacing between light emitting elements, both within a single display module and across a plurality of display modules when the plurality are assembled into a large, unified, visual display.

The present disclosure provides systems and methods of monitoring and calibration of displays that may be in indoor or outdoor locations. Basic system features include: an electro-optical image acquisition system; a moveable linkage coupled to the image acquisition system, the linkage having at least two defined positions: a deployed position in which the image acquisition system is disposed and directed so that the viewing plane of the display is imageable by the image acquisition system; and a stored position in which the image acquisition system is protected from the environment. The image acquisition system has spatial resolution and sensitivity to both color and luminous flux sufficient to enable monitoring and calibration operations using data acquired by the image acquisition system.

Each time the moveable linkage is moved into the deployed position, the image acquisition system is disposed in the same position and orientation with respect to the position and orientation of the viewing plane of the display. Each time the moveable linkage is moved into the stored position, the image acquisition system is disposed to protect it from the environment, direct sun exposure, precipitation, etc.

Raw data acquired by the image acquisition system may be processed to provide normalized image data from the display. In turn, normalized image data may be processed to provide calibration data for use in calibrating the display's visual performance according to desired characteristics. In turn, calibration data may be processed by the display to affect, adjust, or perfect the visual performance of the display.

Acquisition of raw data by the image acquisition system may occur autonomously or under the control of a remote agent. Autonomous acquisition may occur according to a pre-established calendar or schedule. Autonomous acquisition may furthermore be condition responsive with respect to ambient lighting, temperature, time-of-day, or weather conditions. For example, it may be advantageous to delay acquisition of raw data if it is raining or snowing outside. Condition responsive acquisition may delay or otherwise schedule acquisition until local conditions are more suitable.

Raw data may be acquired from the image acquisition system and processed to form calibration data, which can then be acted upon locally to accomplish an in-situ adjustment to the visual performance of the display. In addition, raw data acquired by the image acquisition system may be transmitted from the display to a remote entity, thereby facilitating processing of the raw data by a remote entity. Calibration data may be computed remotely and then transmitted to the display system, which can then act locally to accomplish an in-situ adjustment to the visual performance of the display.

When in the deployed state, the image acquisition system is disposed with respect to the viewing plane of the display in a definite position and orientation. This establishes a known geometric relationship between the viewing plane and the image acquisition system. Under certain circumstances the previously mentioned geometric relationship may cause undesirable non-uniformities in the raw data. Many of the feasible geometric relationships between viewing plane and image acquisition system result in raw data that captures more light from some regions of the viewing plane and less light from other portions of the display plane.

The known geometric relationship may be combined with the known electro-optical properties of the image acquisition system to form a normalization function that substantially counteracts the undesirable non-uniformities arising from the known geometric relationship. The step of normalizing the acquired raw data may precede the step of forming calibration data. Use of the calibration data may then proceed as before.

A sequence of one or more calibration patterns may be displayed on the viewing plane. Raw data may be captured by the image acquisition system corresponding to the one or more calibration patterns. The captured data may be used singly or jointly by means of one or more statistical combinations of more than one image. Raw data may then be processed to produce calibration data for the display. The calibration data may pertain to a plurality of individual light emitting elements of the display or may apply to regions containing a plurality of light emitting elements. Calibration data may comprise data corresponding to one or more of the following visual performance characteristics of the display: white point, color gamut, color balance, gamma correction, and brightness.

Exemplary Embodiment 1.0—According to an embodiment of the present disclosure, a monitoring system for use with a display having a plurality of light emitting elements arranged in a predetermined pattern collectively forming a viewing plane comprises:

an image acquisition system triggerable to capture one or more images, each captured image comprising an image of at least a portion of the viewing plane, said image acquisition system comprising a plurality of light receiving elements arranged in a predetermined pattern collectively forming an imaging plane;

an actuateable linkage coupled to said image acquisition system, said linkage operative to move said image acquisition system between a deployed position and a stored position;

said deployed position characterized in that said image acquisition system is disposed in a predetermined position to capture an image of at least a portion of the viewing plane;

said stored position characterized in that said image acquisition system is substantially protected from airborne particulates and is substantially protected from both condensed and non-condensed atmospheric moisture.

Exemplary Embodiment 1.1—According to another embodiment of the present disclosure, exemplary embodiment 1.0 is further characterized in that: the image acquisition system is triggerable to capture one or more images, each captured image being an image comprising the entire viewing plane; and the deployed position is further characterized in that said image acquisition system is disposed in a predetermined position to capture one or more images of the entire viewing plane.

Exemplary Embodiment 1.2—According to another embodiment of the present disclosure, exemplary embodiment 1.1 is further characterized in that each light emitting element of said viewing plane is uniquely imageable by at least one of said plurality of light receiving elements forming said imaging plane.

Exemplary Embodiment 1.3—According to another embodiment of the present disclosure, exemplary embodiment 1.1 is further characterized in that the display comprises a plurality of display modules, each display module comprising a plurality of light emitting elements arranged in a predetermined pattern, said plurality of display modules collectively forming the viewing plane; the system further characterized in that each display module of said viewing plane is uniquely imageable by at least one of said plurality of light receiving elements forming said imaging plane.

Exemplary Embodiment 2.0—According to another embodiment of the present disclosure, any of exemplary embodiments 1.0, 1.1, or 1.2 may be further characterized in that: a surface normal vector is defined at each of said plurality of light emitting elements perpendicular to said viewing plane; an incidence vector is defined for each of said plurality of light emitting elements starting at each of said plurality of light emitting elements and directed toward the portion of the imaging plane that images each of said light emitting elements, each incidence vector having both a direction and a distance; each light emitting element of the display producing a first luminous output in the direction of said surface normal and a second luminous output in the direction of the incidence vector, said first and second luminous outputs being in a substantially known relationship; the system additionally comprising a data processing means operable to compute a normalized calibration image by applying said substantially known relationship to one or more images captured by said image acquisition system, the normalized calibration image comprising an estimate of said first luminous output for each of said plurality of light emitting elements.

Exemplary Embodiment 2.1—According to another embodiment of the present disclosure, exemplary embodiments 1.0, 1.1 or 1.2 may be further characterized in that: a viewpoint vector is defined at each of said plurality of light emitting elements, each viewpoint vector being directed in the same direction from each of said plurality of light emitting elements; an incidence vector is defined for each of said plurality of light receiving elements starting at each of said plurality of light emitting elements and directed toward the portion of the imaging plane that images each of said light emitting elements, each incidence vector having both a direction and a distance; each light emitting element of the display producing a first luminous output in the direction of said viewpoint vector and a second luminous output in the direction of the incidence vector, said first and second luminous outputs being in a substantially known relationship; the system additionally comprising a data processing means operable to compute a normalized calibration image by applying said substantially known relationship to one or more images captured by said image acquisition system, the normalized calibration image comprising an estimate of said first luminous output for each of said plurality of light emitting elements.

Exemplary Embodiment 2.2—According to another embodiment of the present disclosure, any of exemplary embodiment 1.3 may be further characterized in that: a surface normal vector is defined at each of said plurality of display modules perpendicular to said viewing plane; an incidence vector is defined for each of said plurality of display modules starting at about the centroid of the display plane of each of said plurality of display modules and directed toward the portion of the imaging plane that images each of said display modules, each incidence vector having both a direction and a distance; each display module of the display producing a first luminous output in the direction of said surface normal and a second luminous output in the direction of the incidence vector, said first and second luminous outputs being in a substantially known relationship; the system additionally comprising a data processing means operable to compute a normalized calibration image by applying said substantially known relationship to one or more images captured by said image acquisition system, the normalized calibration image comprising an estimate of said first luminous output for each of said plurality of display modules.

Exemplary Embodiment 2.3—According to another embodiment of the present disclosure, exemplary embodiment 1.3 may be further characterized in that: a viewpoint vector is defined at each of said plurality of display modules, each viewpoint vector being directed in the same direction from each of said plurality of display modules; an incidence vector is defined for each of said plurality of display modules starting at about the centroid of the display plane of each of said plurality of display modules and directed toward the portion of the imaging plane that images each of said display modules, each incidence vector having both a direction and a distance; each display module of the display producing a first luminous output in the direction of said viewpoint vector and a second luminous output in the direction of the incidence vector, said first and second luminous outputs being in a substantially known relationship; the system additionally comprising a processing means operable to compute a normalized calibration image by applying said substantially known relationship to one or more images captured by said image acquisition system, the normalized calibration image comprising an estimate of said first luminous output for each of said plurality of display modules.

Exemplary Embodiment 2.4—According to another embodiment of the present disclosure, exemplary embodiment 2.0, 2.1, 2.2, or 2.3 further characterized in that first and second luminous outputs comprise one or more of the following properties: luminous intensity, wavelength of luminous output.

Exemplary Embodiment 3.0—According to another embodiment of the present disclosure, exemplary embodiments 2.0, 2.1, 2.2, 2.3, or 2.4 further comprising: a display control system operable to render visual data on said display, said display control system responsive to one or more of said normalized calibration images to change the rendering of visual data upon at least a portion of the display.

Exemplary Embodiment 3.1—According to another embodiment of the present disclosure, exemplary embodiment 3.0 in which the change in rendering of visual data upon the display changes one or more of the following visual characteristics of at least a portion of the display: white point, color gamut, color balance, gamma correction, grayscale rendering, and brightness.

Exemplary Embodiment 3.2—According to another embodiment of the present disclosure, exemplary embodiment 3.0 or 3.1, the display control system further characterized in that the rendering of visual data on the display comprises the steps of:

receiving visual media data, the visual media data comprising brightness and color information for each of a plurality of picture elements at an encoded resolution;

transforming the received visual media data by combination with display specific calibration data thereby forming a set of corresponding visual data at a display resolution, the calibration data comprising adjustments to one or more of the following visual characteristics: white point, color gamut, color balance, gamma correction, and brightness; and, displaying the visual data on at least a portion of said viewing plane.

Exemplary Embodiment 4.0—According to another embodiment of the present disclosure, an in-situ monitoring and calibration system for a display, the display comprising a plurality of light emitting elements collectively creating a viewing plane with a displayed resolution, the system comprising:

a display control system operative to:

receive visual media data comprising brightness and color information for each of a plurality of picture elements at an encoded resolution;

receive calibration data comprising adjustments to brightness and color for each of a plurality of light emitting elements comprising said display;

transform said visual media data using said calibration data thereby forming a set of visual data at said display resolution, said set of visual data corresponding to said visual media data;

display said set of visual data upon said the viewing plane of said display;

display a sequence of one or more calibration images upon said display;

an image acquisition system triggerable to capture one or more images, each captured image comprising an image of at least a portion of the viewing plane, said image acquisition system comprising a plurality of light receiving elements arranged in a predetermined pattern collectively forming an imaging plane, further characterized in that said image acquisition system is disposed in a predetermined position to capture one or more images of the entire viewing plane;

said display control system further operative to trigger said image acquisition system to capture one or more images of said one or more calibration images and, for each calibration image displayed on said viewing plane, create a normalized image.

Exemplary Embodiment 5.0—According to another embodiment of the present disclosure, a method for in-situ monitoring and calibration of a display, the display comprising a plurality of light emitting elements collectively creating a viewing plane with a displayed resolution, the method comprising the steps of:

presenting a calibration image on the viewing plane of a display;

acquiring, with an image acquisition system having a plurality of imaging elements collectively creating an imaging plane, a captured image of the displayed calibration image, each light emitting element of the viewing plane being in a known relationship to the region of the imaging plane that images each light emitting element;

applying said known relationship to said raw image to form a normalized image;

comparing said normalized image to said calibration image and generating a calibration data set that encodes the differences between said calibration image and said normalized image;

applying said calibration data set, in a display control system, to modify the rendering of one or more displayed images.

BRIEF DESCRIPTION OF THE DRAWINGS

These and other features, aspects, and advantages of the present invention will become better understood with regard to the following description, appended claims, and accompanying drawings where:

FIG. 1A shows a square consistent with a regular four-sided polygon.

FIG. 1B shows a square tiling of a two-dimensional plane.

FIG. 1C shows coordinate axis defined on square tiling. Enlarged view 1D is indicated.

FIG. 1D shows an enlarged view of the indicated region of FIG. 1C showing uniform row and column pitch distance.

FIG. 1E shows a plan view of a display module having a plurality of light emitting elements coordinate axis defined on square tiling.

FIG. 1F shows the display module of FIG. 1E overlaid with the predetermined pattern of square tiling and coordinate axes.

FIG. 1G shows a plan view of two display modules aligned along their y-axis.

FIG. 1H shows a plan view of two display modules aligned along their x-axis.

FIG. 4C shows relative illuminance as a function of angle with respect to the X-X axis, and relative illuminance as a function of angle with respect to Y-Y axis.

FIG. 10A shows a perspective view of an in-situ display monitoring and calibration system with a calibration image displayed on the viewing plane of the display. The system is shown comprising two image acquisition systems which collectively image the entire viewing plane.

FIG. 10B is a representation of a captured image as captured by a first image acquisition system, the captured image being of a portion of a calibration pattern displayed on the viewing plane of a display. Visible in the figure are image features F1 and F4 which correspond to known geometric G1 and G4 features, respectively, of the display.

FIG. 10C is a representation of a captured image as captured by a second image acquisition system, the captured image being of a portion of a calibration pattern displayed on the viewing plane of a display. Visible in the figure are image features F2 and F3 which correspond to known geometric G2 and G3 features, respectively, of the display.

LIST OF REFERENCE NUMBERS APPEARING IN THE FIGS

Figure 2A:
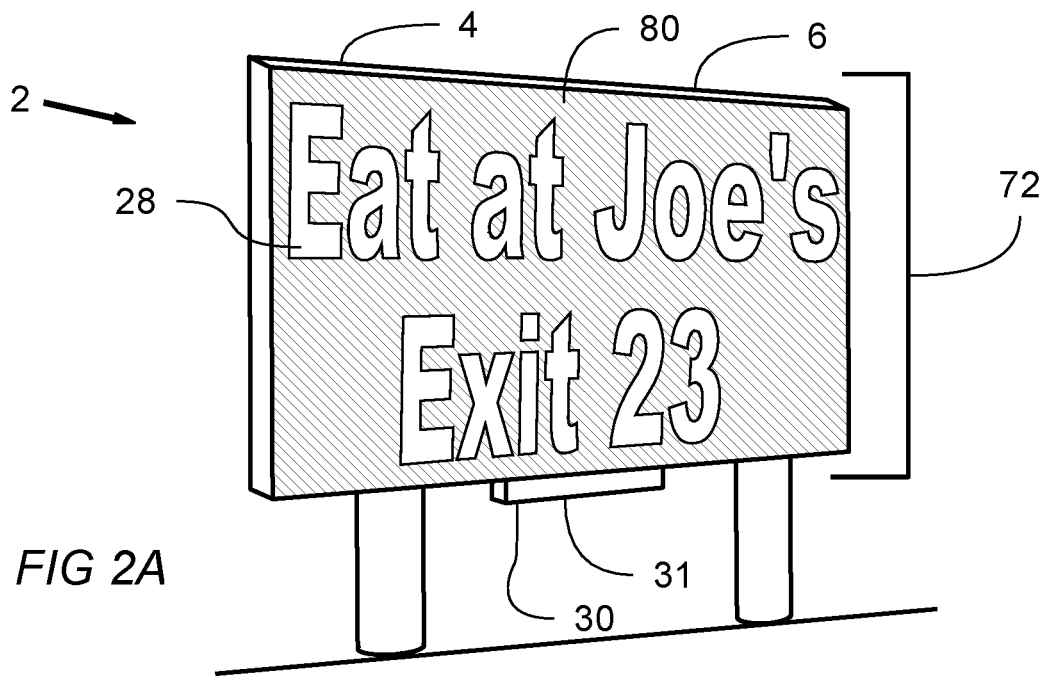
FIG. 2A shows a perspective view of an in-situ display monitoring and calibration system with a typical frame of visual media displayed on the viewing plane of the display. An image acquisition system is shown in a stored position.

2—in-situ display monitoring and calibration system
4—display
6—display control system
8—coordinate system showing x-axis, y-axis, and z-axis
8X—x-axis
8Xa, 8Xb—first x-axis, second x-axis
8Y—y-axis
8Ya, 8Yb—first y-axis, second y-axis
8Z—z-axis
10—square tile, which is a regular 4-sided polygon
10a, 10b, etc.—first square, second square, etc.
11—pitch distance
12—square tiling of the plane
12v—representative vertex of the square tiling
12s—representative side of the square tiling
14—predetermined pattern corresponding to a tiling of the plane 16—rectangular tiling of the plane
20—actuateable linkage
21—Communication network
22—data processing means
23—visual media data
24—calibration pattern
25—expected image
26—calibration data set
27—transformed visual media data
28—visual media rendered on the viewing plane of the display
29—configuration data
30—image acquisition system
30a, 30b—first, second image acquisition system
31—image acquisition system stored position
33—image acquisition system deployed position
34—plurality of light receiving elements
35—relative illuminance
36—imaging plane
38—captured image
40—normalized image
41—normalization function
50—incidence vector
50a, 50b, 50c, . . . —first, second, third, etc. incidence vector
70—display module
70a, 70b, 70c, . . . —first, second, third, etc. display module
71—light emitting element
71a, 71b, etc.—first, second, etc. light emitting element
72—plurality of light emitting elements
72a, 72b, etc.—first light emitting element, second light emitting element, etc.
74—display plane
74a, 74b—first display plane, second display plane
75—display plane disposed at a first angle with respect to the viewing plane
76—display module substrate
78—display assembly
78a, 78b, 78c, etc.—first, second, third, etc. display assembly
80—viewing plane
82—surface normal vector
84—luminous output
84a, 84b, . . . —first, second, etc. luminous output
86—viewpoint vector
86a, 86b, . . . —first, second, etc. viewpoint vector
$\{i, j, k\}$—unit vectors in x, y, and z directions, respectively
$\{x_0, y_0, z_0\}$—location of the center of the imaging plane in 3 dimensions
$\{x_i, y_i, z_i\}$—location of the $i^{th}$ light emitting element in 3 dimensions
$\{a_i, b_i, c_i\}$—direction cosines corresponding to the $i^{th}$ incidence vector, the incidence vector having the form: $a_i*i+b_i*j+c_i*k$
$G_1, G_2, G_3, G_4$—first, second, third, fourth geometric feature of the viewing plane
$F_1, F_2, F_3, F_4$—first, second, third, fourth geometric feature identified in a captured image, in which $F_1$ corresponds to $G_1$, $F_2$ corresponds to $G_2$, $F_3$ corresponds to $G_3$, and $F_4$ corresponds to $G_4$.
r0, r1, r2—first, second, third radial distances from a reference point
A0—area located at a distance of r0
A1—projection of area A0 at distance r1
A2—projection of area A0 at distance r2
200—a process for rendering visual media on a viewing plane
202—process step of receiving, in a display control system, a frame of visual media data
204—process step of transforming a frame of visual media data in a display control system
206—process step of displaying a transformed frame of visual media
300—a process for creating a normalized image
302—process step of positioning in a deployed position with respect to a display, an image acquisition system
304—process step of triggering an image acquisition system to acquire a captured image
306—process step of defining an incidence vector for each of a plurality of light receiving elements
308—process step of associating with each of the light receiving elements comprising the imaging plane a normalization function
310—process step of applying a normalization function to a captured image thereby producing a normalized image
400—a process for calibrating a display
402—process step of displaying a calibration pattern
404—process step of associating an expected image with a calibration pattern
406—process step of triggering an image acquisition system to acquire a captured image of a viewing plane
408—process step of creating a normalized image from a captured image
410—process step of forming a calibration data set comprising the color and brightness differences between an expected image and a normalized image
412—process step of applying, in a display control system, a calibration data set to the rendering of visual media upon a viewing plane of a display such that the differences between a normalized image and an expected image are reduced.

DESCRIPTION

Uniformity in color, brightness, grayscale are fundamental visual performance goals for a large display. Any visual non-uniformity present on the viewing plane of the display is easily noticed by viewers due to the highly refined and discriminating qualities of the human visual system. It often happens that one or more light emitting elements or display modules must be replaced due to damage, aging, or acts of nature. A replacement light emitting element or display module often has a different grayscale, brightness and/or color response as the element or module, respectively, that the light emitting element or display module replaces. In-situ monitoring and calibration of a display is particularly effective for maintaining uniformity in color, brightness, and grayscale across the entire viewing plane of the display, even when replacement of light emitting elements becomes necessary.

In general terms, in-situ display monitoring and calibration uses an image acquisition system to capture images of the viewing plane of the display. Captured images may then be processed to characterize various visual performance characteristics of the display. When not in use capturing images of the display, the image acquisition system can be stored in a manner that protects it from environmental hazards such as dust, dirt, precipitation, direct sunlight, etc. In addition, images may be presented on the display that facilitate the calibration process. For example, a calibration image in which a plurality of light emitting elements is set to a particular color and intensity may be displayed, an image then captured, and then a difference between what was expected and what was captured may be developed for each light emitting element. Differences between captured images and expected images may be used to create a calibration data set which then may be used to adjust the display of further images upon the display.

The visual performance of a display may be referenced from a defined viewpoint, which is essentially a point in 3-dimensional space from which the viewing plane is viewed by a person. The image acquisition system has an imaging plane for capturing images that is generally not at the same location as the viewpoint. A captured image may be post processed to infer what the display looks like at the viewpoint of choice. Each light emitting element of the display has a predetermined position and orientation in space. Each light emitting element produces an outgoing illuminance that varies in both brightness and color depending on the distance to the viewer and on the angle between the viewer and the illuminance pattern produced by the light emitting element. Knowing the distance, angles, and illuminance pattern between a light emitting element and an image plane enables the system to capture images of the viewing plane on the imaging plane and then infer, by computations involving the know distance, angles, and illuminance pattern, what the viewing plane looks like when viewed from the viewpoint. Both monitoring of the display and calibration of the display are thereby enabled by the system and methods of the present disclosure.

To further facilitate the present description, it will be useful now to turn to the construction of a display according to various embodiments of the present disclosure. Tesselation of a planar surface is the tiling of the plane using one or more geometric shapes, called tiles, creating no gaps and no overlaps. A periodic tiling has a repeated geometric pattern. A regular tiling is a tiling in which all tiles are regular polygons having the same size and shape. Square, triangular, and hexagonal tilings are each an example of a regular, periodic tiling that can achieve a tesselation of a planar surface without gaps or overlaps. Tilings are of special interest in the construction of modular displays because their properties enable the construction of large displays with desirable properties. Assembling a plurality of smaller display modules in which each display module is configured to have a size, shape, and orientation corresponding to a predetermined tiling may produce a large display having no gaps and no overlaps between adjacent display modules.

Within a single display module, a plurality of light emitting elements may be arranged in a predetermined pattern derived from an appropriately configured tiling. A planar tiling of regular polygons consists of edges and vertexes. The set of vertexes of a regular polygon tiling can be seen to create a pattern with a high degree of regularity. A highly uniform visual effect may be produced by placing a light emitting element at or about each of the vertexes of a regular polygon tiling.

Light emitting elements of the present disclosure may each comprise a single light emitting device or multiple light emitting devices. A preferred light emitting element combines red, blue, and green light emitting devices within one light emitting element so as to provide full color spectrum display. Monochrome and other combinations of devices may be used still within the spirit and scope of this disclosure. In other embodiments a light emitting element may comprise white, red, blue, and green devices within a single light emitting element. In other embodiments a light emitting element may comprise red, green, blue, and cyan devices. In other embodiments a light emitting element may comprise red, green, blue, yellow, and cyan devices, or any combination of devices emitting at different colors within a single light emitting element. In other embodiments multiple devices emitting at substantially the same color may be used.

In still other embodiments of the present disclosure, light emitting elements may be replaced by light reflective elements. A light reflective element may receive a portion of incoming ambient or directed light and then reflect a portion of the light back to the viewer of a display. Modulating the reflective properties of the light reflective element allows control over the intensity of the reflected light. The portion of incoming ambient or directed light that is not reflected to a viewer may be absorbed, scattered, or otherwise redirected so that it is substantially attenuated with respect to a viewer of the display. A plurality of light reflective elements may be modulated so as to produce images upon a viewing plane. For a light source, a reflective display system may use ambient light, directed non-ambient light, or a combination of both ambient and directed non-ambient light in producing a display.

In creating a uniform visual effect, it is useful to consider a property called pitch distance, which is the distance between any light emitting element and its closest adjacent light emitting elements. It can be seen that a highly uniform visual effect is produced by maintaining a highly uniform pitch throughout a single display module and across a plurality of adjacent display modules. Preferred embodiments of the present disclosure use light emitting elements located at or about the vertexes of a regular polygon tiling. A regular square tiling is one such preferred tiling, producing a uniform visual effect by providing uniform spacing between both rows and columns of light emitting elements. The spacing between adjacent rows and between adjacent columns of a regular square tiling may be referred to as the pitch of that pattern. In such a square tiling, it can be seen that any light emitting element will have at least two closest adjacent neighboring elements that are spaced apart from each other by a distance close to or substantially equal to the pitch distance.

In addition to uniform pitch within a single display module, the spacing between display modules can be controlled so that uniform pitch of light emitting elements is maintained across a plurality of assembled display modules. A preferred embodiment is to provide a display module with a perimeter region, of a predetermined width, that contains no light emitting elements. The preferred width of the perimeter region is less than or about equal to one half of the pitch distance, when measured inward and along the edges of the regular polygon tiling defining the location of the plurality of the light emitting elements. When two display modules are assembled adjacent to one another, each module may provide a perimeter region width of about one half of the pitch, which cumulatively creates a pattern of uniform pitch spanning both modules. A plurality of display modules may thereby be assembled to create uniform pitch spanning the plurality of display modules.

A single display module may comprise a plurality of light emitting elements coupled to a substrate and arranged in a predetermined pattern corresponding to the vertexes of a regular polygon tiling. The display module has a perimeter. A plurality of display modules may be assembled such that a portion of the perimeter of each display module abuts a portion of the perimeter of at least one other display module, each module positioned to maintain uniform pitch spacing across the plurality of display modules.

A display system according to the present disclosure may be constructed by assembling a plurality of display modules onto a support frame, the support frame having been previously constructed.

Turning now to FIG. 1A, shown is a regular four-sided polygon, also called a square 10, consistent with the square tiling 12 of the two-dimensional plane shown in FIG. 1B. A coordinate system 8 is indicated so as to make discussion of geometry features of the present disclosure clearer. Square tiling 12 is comprised of a plurality of square tiles, of which first square 10a and second square 10b are typical, arranged so that no gaps and no overlaps are produced. When arranged into the predetermined pattern shown in FIG. 1B, the square tiling 12 can be seen to create a plurality of vertex 12v and a plurality of side 12s, in which every vertex 12v is separated a distance of about 12s from each of its closest neighboring vertexes.

FIG. 1C shows predetermined pattern corresponding to a tiling of the plane 14 according to a square tiling. Overlaid onto the predetermined pattern corresponding to a tiling of the plane 14 are x-axis 8X and y-axis 8Y, showing that a coordinate system can be overlaid onto the predetermined pattern to facilitate clear disclosure of the location and alignment of other features to be described. The enlarged section, denoted FIG. 1D, shows that the square tiling of the plane gives rise to a highly uniform spacing of vertexes, which can be characterized as pitch distance 11. Pitch distance 11 corresponding to the predetermined pattern 14 gives rise to uniform spacing between rows and columns when that predetermined pattern is based upon a square tiling. It can be seen that row spacing and column spacing are both about equal to the pitch distance 11.

Turning now to FIG. 1E, shown is a display module 70 having a plurality of light emitting elements 72, of which first light emitting element 71a and second light emitting element 71b are individual members of the plurality. Plurality of light emitting elements 72 is shown arranged according to a predetermined pattern so as to create a highly uniform visual effect upon display plane 74. FIG. 1F shows how predetermined pattern 14 according to a square tiling of the plane may be used to position individual light emitting elements 71a, 71b, and 71c according to the location of the vertexes of said predetermined pattern 14. Superimposed upon the plurality of light emitting elements are x-axis 8X and y-axis 8Y. The display module 70 of FIG. 1F comprises a plurality of light emitting elements, each of which may be a single light emitting device or multiple light emitting devices. A preferred light emitting element combines red, blue, and green light emitting devices within one light emitting element so as to provide full color spectrum display. Monochrome and other combinations of devices may be used still within the spirit and scope of this disclosure. The display modules of FIG. 1E and FIG. 1F each have a region adjacent to their perimeter that is free from light emitting elements. This enables close spacing of adjacent modules as will be seen now.

FIG. 1G shows a first display module 70a adjacent to a second display module 70b and disposed so that their display planes 74a and 74b abut and their respective y-axes 8Ya and 8Yb are substantially aligned, thereby creating a highly uniform visual effect that spans the combined display modules. A pitch distance can be defined between adjacent light emitting elements between adjacent display modules that is substantially equal to the pitch distance between adjacent light emitting elements within a single display module.

FIG. 1H shows a first display module 70a adjacent to a second display module 70b and disposed so that their respective display planes 74a and 74b abut and their respective x-axes 8Xa and 8Xb are substantially aligned, thereby creating a highly uniform visual effect that spans the combined display modules. A pitch distance can be defined between adjacent light emitting elements between adjacent display modules that is substantially equal to the pitch distance between adjacent light emitting elements within a single display module. When abutted and aligned in the foregoing manner, two adjacent modules may be combined such that their combined plurality of light emitting elements are disposed upon a single predetermined pattern 14 defining a regular tiling of the plane.

FIG. 1G and FIG. 1H make it clear that a large display may be constructed from display modules designed according to the teaching of FIG. 1A-FIG. 1H. Such a large display will tile the two-dimensional plane without gaps and without overlaps and produce a highly uniform visual effect. Any number of display modules may be combined in both x and y directions to make a large display that is substantially free from visual aberrations.

Turning now to FIG. 2A, shown is a representative environment for using in-situ display monitoring and calibration system 2. The figure shows a perspective view of a display 4, controlled by display control system 6, the display having a plurality of light emitting elements 72 disposed in a predetermined pattern collectively creating a viewing plane 80. The plurality of light emitting elements may be formed in a predetermined pattern according to any of the teachings of FIG. 1A-FIG. 1H. On the display is shown representative visual media 28 rendered on viewing plane 80. Image acquisition system 30 is shown in a stored position 31.

Figure 2B:
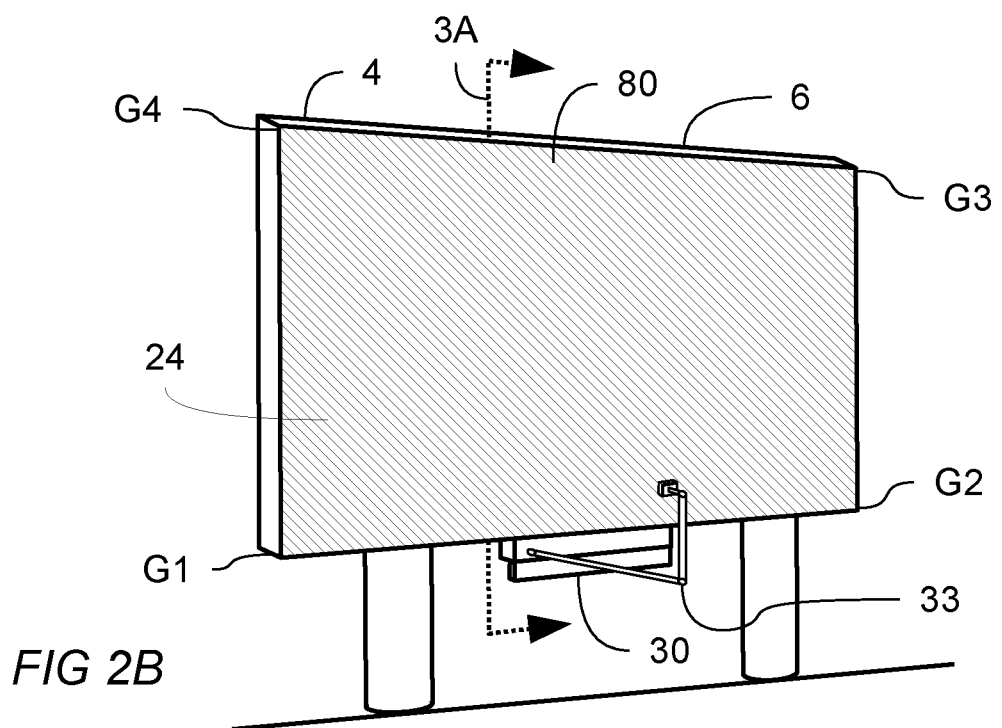
FIG. 2B shows a perspective view of the system of FIG. 2A with a calibration pattern displayed on the viewing plane of the display. An image acquisition system is shown in a deployed position. Cross-sectional view 3A is indicated.

FIG. 2B shows the display 4 of FIG. 2A and additionally shows image acquisition system 30 in a deployed position 33 with a calibration pattern 24 rendered on the viewing plane of display 4. Associated with the display is display control system 6, which is operative to control the presentation of visual media on the display as well as to control the presentation of calibration patterns 24. The viewing plane 80 of display 4 in FIG. 2A and FIG. 2B has a predetermined geometric shape, geometric features G1, G2, G3, and G4 being associated with that geometric shape. In the embodiment of FIG. 2A and FIG. 2B, the geometric features identified as G1, G2, G3, and G4 are corners of rectangular viewing plane 80. Other embodiments may have a viewing plane having a different shape and consequently may have other identifiable geometric features that may be corners, edges, curved shapes, or other identifiable geometric features.

The deployed position 33 shown in FIG. 2B places image acquisition system 30 in a predetermined position and orientation with respect to the viewing plane. Said predetermined position and orientation is substantially repeatable each time system 30 is moved to deployed position 33. Causing image acquisition system 30 to cycle from deployed to stored to deployed position again results in disposing image acquisition system in substantially the same position and orientation as in the previous deployed position.

Image acquisition system 30 is triggerable to capture one or more images when the system is in the deployed position. When triggered, an image may be captured, the image comprising at least a portion of the viewing plane. In preferred embodiments the captured image comprises the entire viewing plane. In other preferred embodiments the image acquisition system may comprise a plurality of imaging planes, each having a known position and orientation when in a deployed position, each operative to capture an image of at least a portion of the viewing plane, the plurality of imaging planes operative to capture, collectively, the entire viewing plane.

Figure 3A:
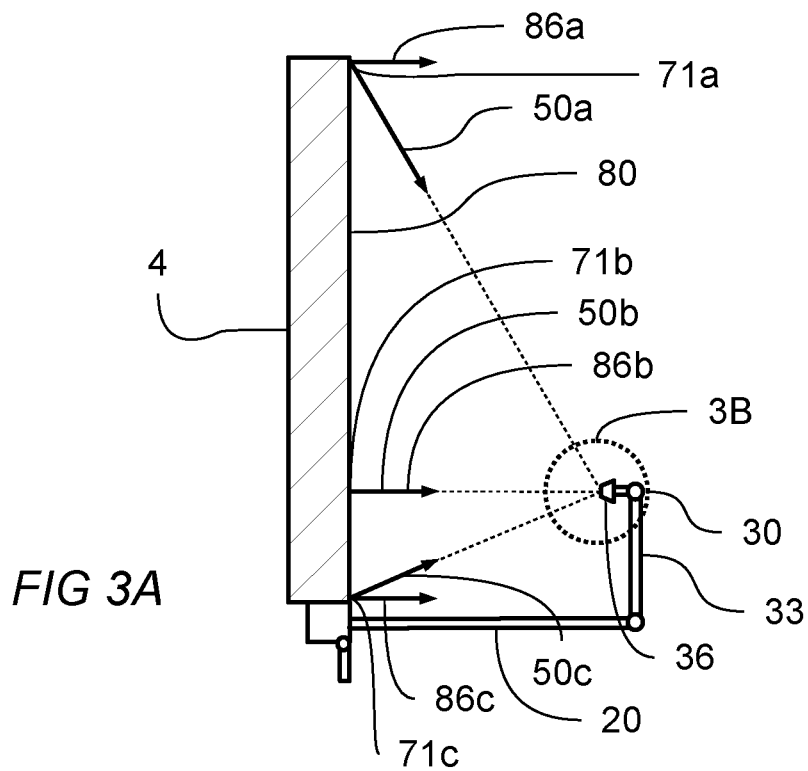
FIG. 3A is a cross-sectional view of an in-situ display monitoring and calibration system that was indicated in FIG. 2B. Enlarged view 3B is indicated.

Turning now to FIG. 3A, shown is a cross section view that was indicated in FIG. 2B. In this view, image acquisition system 30 is shown in deployed position 33, imaging plane 36 being positioned and oriented to capture one or more images of at least a portion of the viewing plane 80 of display 4. In preferred embodiments, image acquisition system 30 may comprise optical and electronic components known in the art for the capture, storage, and transmission of high-resolution digital images suitable for photometric applications. The image acquisition system of FIG. 3A may comprise an actuateable linkage coupled between display 4 and imaging plane 36, the linkage being operable to move between the stored position of FIG. 2A and deployed position 33 of FIG. 2B or FIG. 3A. Imaging plane 36 comprises a plurality of image receiving elements arranged in a predetermined pattern. A jointed, powered, robotic arm is one of a number of feasible embodiments for actuateable linkage 20 consistent with the operational requirements previously described.

The stored position of the image acquisition system may be further characterized in that any electrical and optical components of the image acquisition system contributing to or responsible for capturing images are substantially protected from exposure to environmental contaminants including dust, dirt, moisture, direct sunlight, etc., that may detrimentally affect the operation of the image acquisition system.

Continuing with FIG. 3A, shown are first incidence vector 50a and first viewpoint vector 86a, both originating from a first light emitting element 71a comprising the viewing plane 80. Incidence vector 50a originates at first light emitting element 71a and points to the region on imaging plane 36 that is operable to image first light emitting element 71a. In similar fashion, second incidence vector 50b and second viewpoint vector 86b originate at second light emitting element 71b, and third incidence vector 50c and third viewpoint vector 86c originate at third light emitting element 71c. Incidence vector 50b and 50c originate at second and third light emitting elements 71b and 71c, respectively, and each points to the region on imaging plane 36 that is operable to image second and third light emitting elements 71b and 71c, respectively. An incidence vector may be defined for each light emitting element comprising the viewing plane. It is evident in FIG. 3A that each incidence vector is influenced by the geometrical and optical aspects of the position and orientation of imaging plane 36 with respect to the position and orientation of viewing plane 80.

A viewpoint may be defined anywhere in three-dimensional space from which the viewing plane is visible. The viewpoint represents a viewer located at that distance looking at the viewing plane. For any given, fixed viewpoint, at each light emitting element a viewpoint vector may be defined originating at the light emitting element and extending to the viewpoint. For any given, fixed viewpoint, each light emitting element may be expected to possess a unique viewpoint vector. It is evident from the geometry that a fixed viewpoint located far away from the viewing plane has the property that each viewpoint vector is essentially parallel to every other viewpoint vector. In FIG. 3A first, second, and third viewpoint vectors 86a, 86b, and 86c, respectively, are drawn consistent with a viewpoint that is located far enough away so that the viewpoint vectors are close to being parallel. In other embodiments the viewpoint may be close enough to the viewing plane that the viewpoint vectors are not close to being parallel. It is evident that, regardless of how far the viewpoint is from the viewing plane, all viewpoint vectors converge at the viewpoint.

Each light emitting element produces a luminous flux that radiates away from the light emitting element in 3-dimensional space. To facilitate the discussion, a first surface normal vector may be defined that originates at the location of the light emitting element and extends perpendicular to the local curvature of the viewing plane. In addition, a second surface normal vector may be defined originating at a light receiving element comprising the imaging plane and extending perpendicular to the imaging plane. The portion of a light emitting element's luminous flux that is received remotely from the light emitting element by a light receiving element having a given area is inversely proportional to the squared distance between emitter and receiver and is also a function not only of the brightness of the light emitting element but also of the angle between the first surface normal vector and the second surface normal vector. It is evident that for any predetermined position and orientation of the imaging plane, a unique incidence vector may be defined for each light emitting element comprising the viewing plane and that both angle and distance impact the light that is received on the imaging plane by any particular light emitting element.

An index i may be created for enumerating through each light emitting element comprising the viewing plane. Index i may be allowed to take the values from 1 to N, where N is the total number of light emitting elements comprising the display. An incidence vector may therefore be represented as: $a_i*i+b_i*j+c_i*k$; where $\{a_i, b_i, C_i\}$ are direction cosines corresponding to the $i^{th}$ incidence vector, and $\{i, j, k\}$ are unit vectors in x, y, and z directions, respectively. Furthermore, $\{X_i, y_i, z_i\}$ describes location of the $i^{th}$ light emitting element in 3 dimensions, and $\{x_0, y_0, z_0\}$ describes the location of the center of the imaging plane in 3 dimensions. The distance from any particular light emitting element to the center of the imaging plane can be calculated as: $D_i=[(x_i-x_0)^2+(y_i-y_0)^2+(z_i-z_0)^2]^{1/2}$ Direction cosines $\{a_i, b_i, C_i\}$ are accordingly determined by the formulas:

$$a_i=(x_i-x_0)/D_i;\ b_i=(y_i-y_0)/D_i;\ c_i=(z_i-z_0)/D_i;$$

An even more exacting relationship can be described in which a unique coordinate $\{X_{0i}, y_{0i}, z_{0i}\}$ on the imaging plane is associated with each light emitting element that is imaged. In that case the distance be determined by the formula:

$$D_i = [(x_i - x_{0i})^2 + (y_i - y_{0i})^2 + (z_i - z_{0i})^2]^{1/2}$$

Direction cosines $\{a_i, b_i, c_i\}$ are then determined by computing:

$$a_i=(x_i-x_{0i})/D_i;\ b_i=(y_i-y_{0i})/D_i;\ c_i=(z_i-z_{0i})/D_i;$$

Figure 3B:
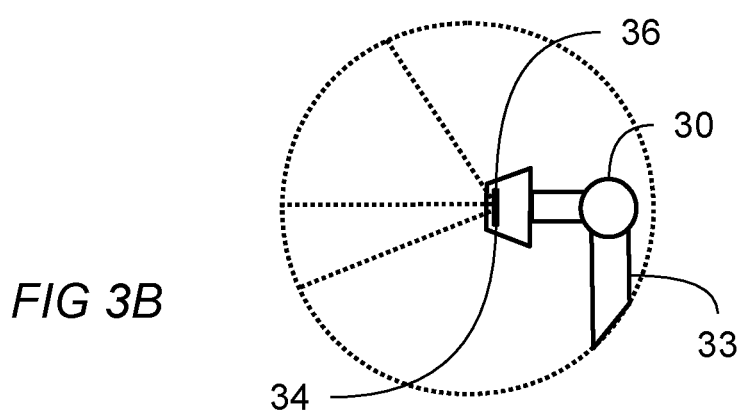
FIG. 3B shows an enlarged view, as noted in FIG. 3A, of an image acquisition system.

FIG. 3B shows an enlarged view of the portion of a portion of image acquisition system 30 in deployed position 33, as shown in of FIG. 3A. Visible in FIG. 3B is a plurality of image receiving elements 34 which collectively form imaging plane 36, and the dotted line paths of incoming incidence vectors corresponding to first, second, and third incidence vectors previously described in connection with FIG. 3A. In the system of FIG. 3A and FIG. 3B, each of the plurality of light emitting elements comprising the viewing plane 80 has associated with it its own incidence vector that points to the region of imaging plane that images the light received from each of the respective light emitting elements.

Figure 4A:
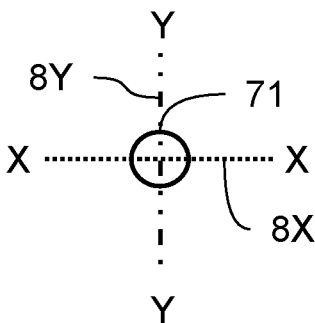
FIG. 4A shows a light emitting element with axes X-X and Y-Y shown to facilitate the understanding of FIG. 4B and FIG. 4C.
Figure 4B:
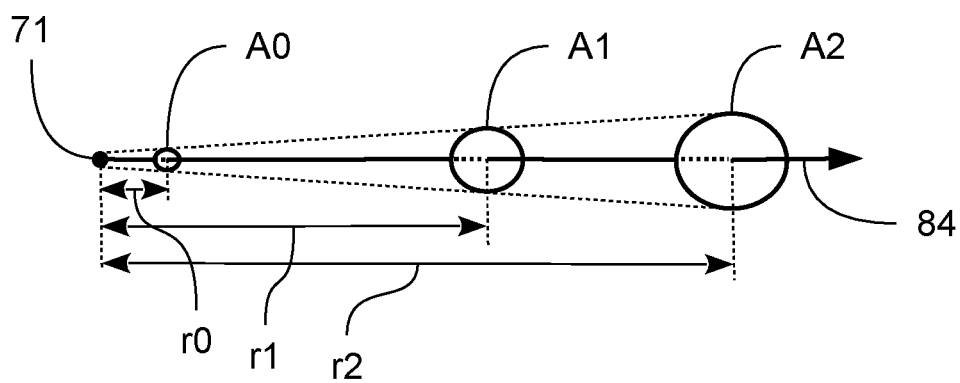
FIG. 4B shows a representation of the $1/r^2$ dependence of illuminance with respect to distance from the light emitting element of FIG. 4A.

Shown now in FIG. 4A is a typical light emitting element 71. An X-X axis is indicated as 8X and a Y-Y axis is indicated as 8Y. Light emitting element 71 produces a luminous output that diverges as it propagates away from the emitter at the speed of light. FIG. 4B is a schematic representation of the effect on luminous flux that distance from the emitter makes. Luminous output 84 propagates away from light emitting element 71. The same luminous output passing through area A0, located at a distance of r0 from the emitter, also passes through area A1, located a distance r1 from area A0, and area A2, located a distance of r2 from area A0. Given luminous output 84 produced by light emitting element 71, the luminous flux measured by a light receiving element having a fixed size will diminish with distance according to an inverse square law with respect to distance from the emitter. A normalization operation can be performed that compensates the measured value of luminous flux for the distance dependence between the emitter and the receiver. Thus, the luminous output received from light emitting elements that are at different distances from the imaging plane can be directly compared after normalization.

Figure 4C:
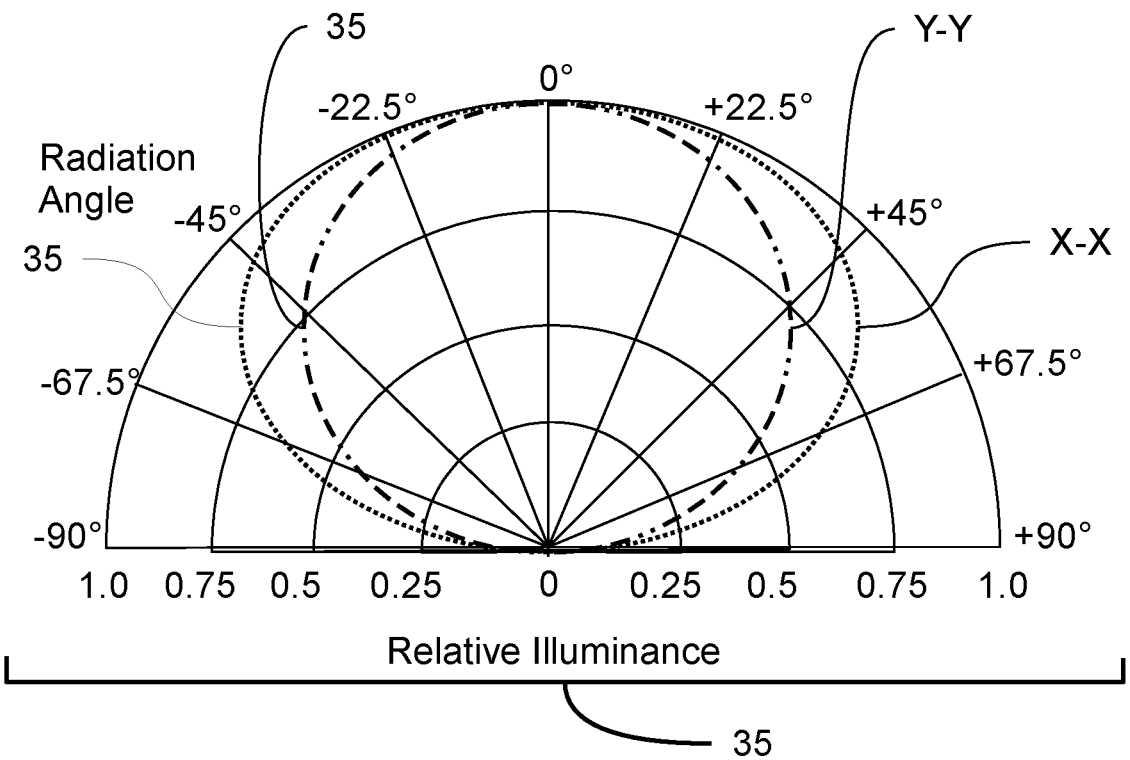
FIG. 4C shows a representative graph of relative illuminance for the light emitting element of FIG. 4A.

FIG. 4C presents a graph of relative illuminance 35 versus radiation angle for the representative light emitting element 71 of FIG. 4A. The reference designators X-X and Y-Y refer back to the light emitting element of FIG. 4A. 0 degrees on the graph corresponds to a direction that is perpendicular to the two-dimensional plane containing both X-X and Y-Y axes. On this graph the maximum illuminance has a value of 1.0, all other values being relative to this maximum. The graph indicates a representative way in which relative illuminance 35 will diminish as the angle with respect to either the X-X axis or the Y-Y axis moves away from 0 degrees. A normalization operation can be performed that compensates for the reduction in relative illuminance caused by angle of incidence between the incidence vector and relative illuminance. Thus, the luminous output received from light emitting elements that are at different angles with respect to the imaging plane can be directly compared after normalization. The angles of incidence with respect to x, y, and z axes can be determined using the direction cosines previously described.

It can be understood that the graph in FIG. 4C is an example of one specific emitter for the purposes of teaching in this disclosure. The exact pattern of radiation produced by any emitter is a multivariate function of the device or devices comprising emitter, the emitter's packaging and how the emitter is mounted with respect to the viewing plane. Embodiments of an in-situ display monitoring and calibration system according to the present disclosure may access configuration data 29 corresponding to one or more of the following: radiation pattern emitted by each emitter; position and orientation of each emitter; and position and orientation of the imaging plane.

Figure 5A:
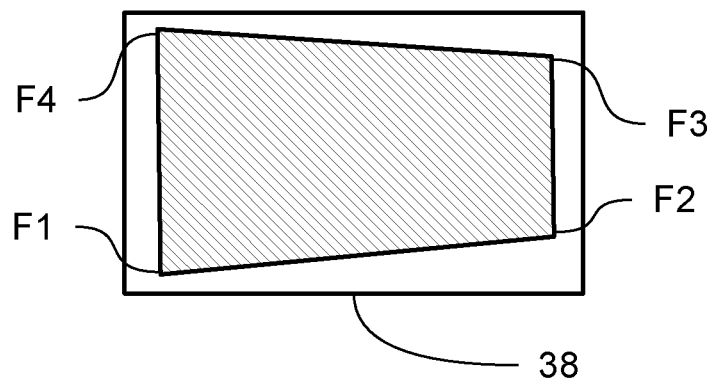
FIG. 5A is a representation of a captured image, the captured image being of a calibration pattern displayed on the viewing plane of a display. Visible in the figure are image features F1, F2, F3, and F4 which correspond to known geometric features of the display.
Figure 5B:
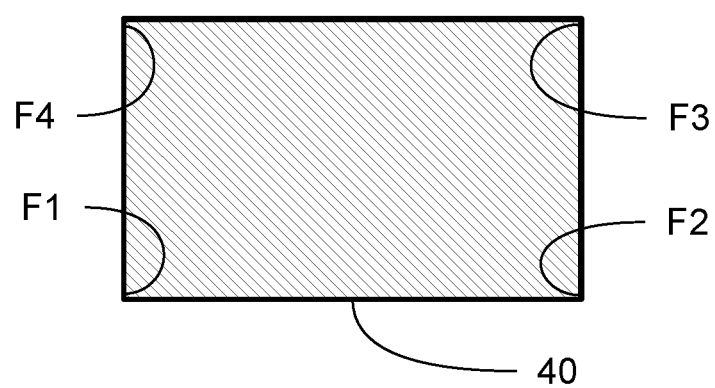
FIG. 5B is a representation of a normalized calibration image corresponding to the calibration pattern captured in FIG. 5A.

Turning now to FIG. 5A, shown is exemplary captured image 38, captured by the image acquisition system. The image is of a rectangular viewing plane that has been captured with projection effects that are common for camera and imaging systems. Visible in captured image 38 are geometric features F1, F2, F3, and F4, which correspond to actual physical features present in the real world. In the embodiment of FIG. 5A features F1, F2, F3, and F4 present in the captured image are counterparts to real world features G1, G2, G3, and G4 visible in FIG. 2B. Real world features G1, G2, G3, and G4 have associated with them {x, y, z} coordinates in three dimensions. The real-world coordinates of G1, G2, G3, and G4 together with the image coordinates of F1, F2, F3, and F4, and calibration data from the imaging system allow an inverse projection transformation to be computed. The inverse projection transformation of the captured image 38 in combination with incidence vector and distance data from each light emitting element, enable the creation of a normalization function which can then be applied to a captured image to produce, as shown in FIG. 5B, a normalized image 40. In essence, normalized image 40 is an estimate, based on the captured image, of what the display looks like from a single viewpoint which may be distinct from position and orientation of the imaging plane. The normalized image may then be used as the basis for photometric operations such as monitoring and/or calibration.

While the embodiments of FIG. 2-FIG. 5 have been described with reference to a single image acquisition system disposed in a position with respect to the display, other embodiments are within the scope of the disclosure. In other embodiments, the image acquisition system may be moved through a sequence of different positions and/or orientations, capturing images from each different position and/or orientation in the sequence. Each different position or orientation of the image acquisition system may be effective for capturing one or more images of a different portion of the viewing plane. In some embodiments a sequence of overlapping images may be acquired. Overlapping image portions may be used to establish registration between adjacent images. Both captured images and overlapping captured images may be used to establish registration between a captured image and the portion of the viewing plane being imaged. A normalization function may be associated with each position and each orientation of the image acquisition system. Thus, a plurality of normalized images may be acquired that collectively creates a normalized composite image of the entire viewing plane. Monitoring and calibration may then proceed according to methods of the present disclosure.

Figure 6:
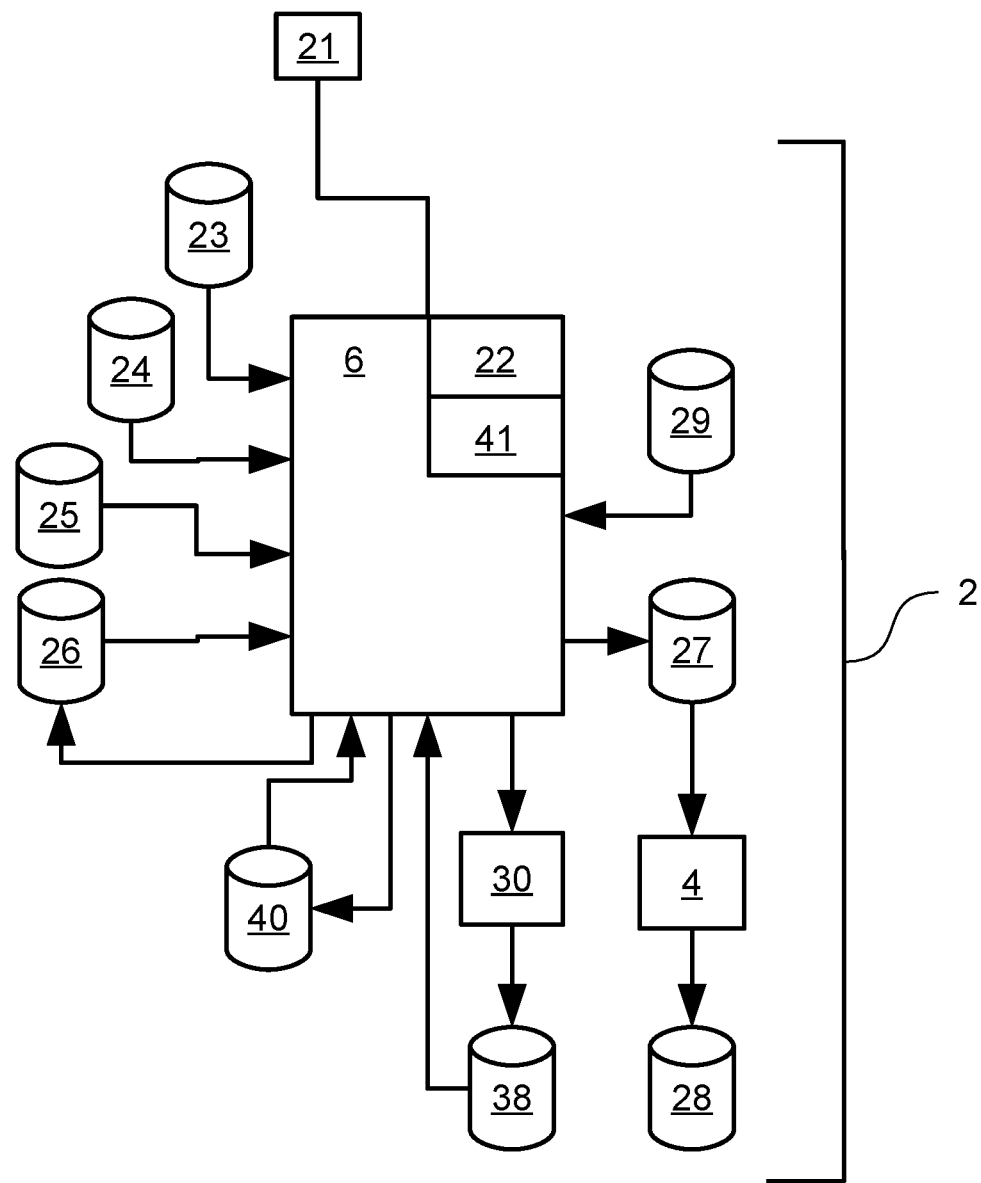
FIG. 6 is a functional block diagram of an in-situ display monitoring and calibration system.

FIG. 6 is a functional block diagram of an in-situ display monitoring and calibration system. The system 2 is shown comprising: an image acquisition system 30 which is triggerable to capture one or more captured image 38 of the viewing plane of a display 4; a display control system 6 having a data processing means 22 and a normalization function 41, the display control system being operative to receive: visual media data 23; one or more calibration pattern 24; one or more expected image 25 each of which is associated individually with at least one of said one or more calibration patterns; one or more calibration data set 26; a configuration data set 29; one or more captured image 38; display control system 6 being further operative to produce transformed visual media data 27 that is rendered via display 4 on to the viewing plane of said display as rendered visual media 28; display control system 6 being further operative to: trigger the image acquisition system 30 to capture one or more captured image 38 of the viewing plane of display 4; produce a normalized image 40 by transforming captured image 38 according to normalization function 41; compare normalized image 40 to expected image 25 and produce one or more calibration data sets 26; transform one or more frames of visual media data 23 according to calibration data set 26 and configuration data set 29 to produce transformed visual media data 27. Visual media data 23 comprises brightness and color information for each of a plurality of pixels at one or more encoded resolutions. Transformed visual media data 27 comprises brightness and color information for each of a plurality of light emitting elements at a displayed resolution.

The apparatus of FIG. 6 may include communications network 21, which may comprise local and/or wide area networking components capable of transmitting or receiving commands and/or data to local or remote destinations. In conjunction with communications network 21, display control system 6 may be further operable to send, receive, and do data processing operations on one or more of the following: visual media data, calibration pattern, expected image, calibration data set, configuration data, captured image, and normalized image.

Figure 7:
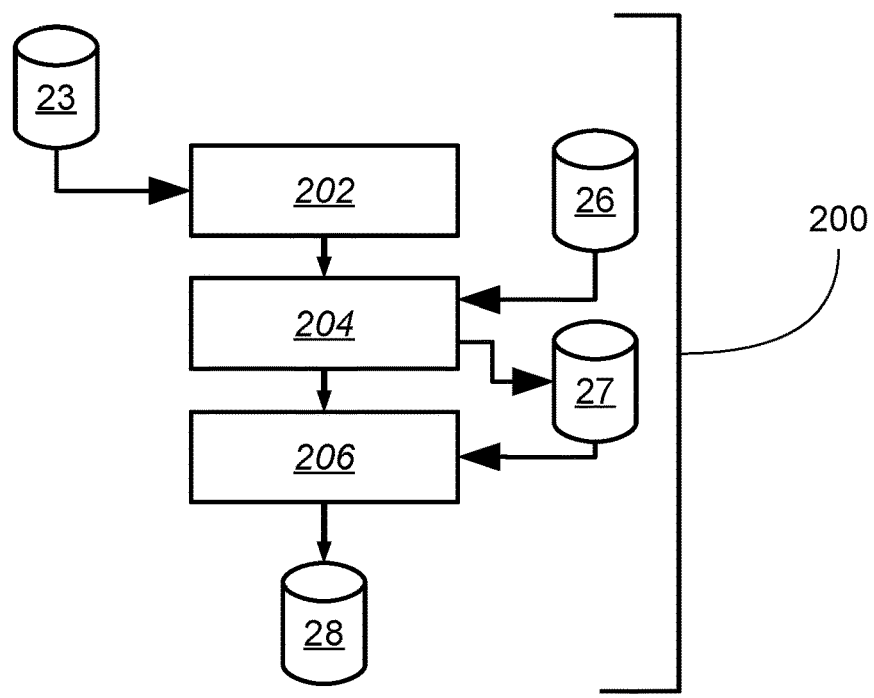
FIG. 7 is a schematic flowchart of a process for rendering visual media data on a display.

FIG. 7 shows a flowchart for a process 200 of rendering visual media on the viewing plane of a display that may be carried out by the in-situ display monitoring and calibration system. Process 200 comprises the steps of:

202 receiving, in a display control system, a frame of visual media data 23, the visual media data comprising brightness and color information at an encoded resolution for each picture element of a plurality of picture elements arranged in a pattern corresponding to said encoded resolution;

204 transforming said frame of visual media data, in said display control system, using a calibration data set 26 to produce a frame of transformed visual media data 27 at a displayed resolution for display on a plurality of light emitting elements collectively forming a viewing plane of a display, said calibration data set comprising adjustments to brightness and color for a plurality of light emitting elements comprising said display;

206 displaying said transformed frame of visual media 28 on at least a portion of said viewing plane of said display.

Figure 8:
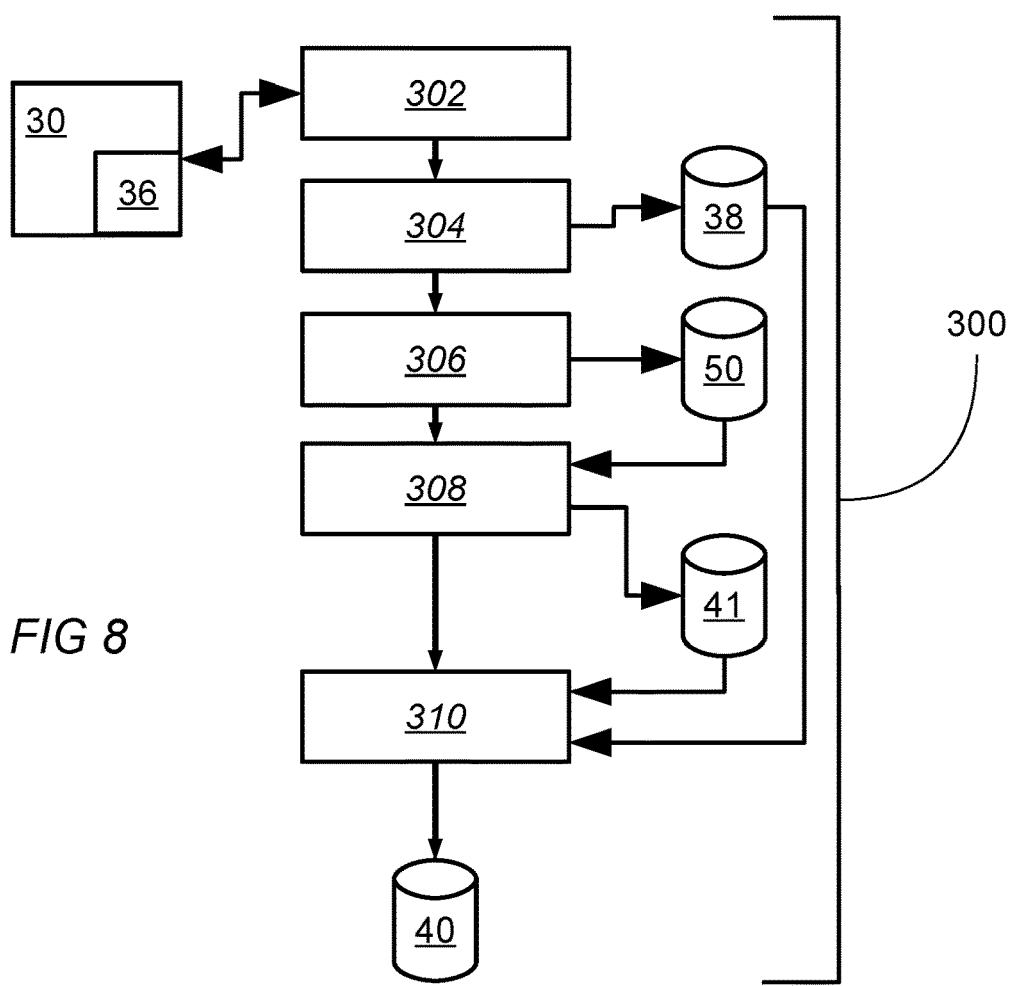
FIG. 8 is a schematic flowchart of a process for creating a normalized image.

FIG. 8 shows a flowchart for a process 300 of creating a normalized image that may be carried out by the in-situ display monitoring and calibration system. Process 300 comprises the steps of:

302 positioning in a deployed position with respect to a display, an image acquisition system 30 having a plurality of light receiving elements collectively forming an imaging plane 36, the display comprising a plurality of light emitting elements arranged in a predetermined pattern collectively creating a viewing plane, such that said viewing plane is imageable upon said imaging plane;

304 triggering the image acquisition system to acquire a captured image 38 of said viewing plane;

306 defining an incidence vector 50 for each of said plurality of light receiving elements starting at each of said plurality of light emitting elements and directed toward the portion of the imaging plane that images each of said light emitting elements, each incidence vector having both a direction and a magnitude;

308 associating with each of said light receiving elements comprising the imaging plane a normalization function 41 that compensates brightness and/or color differences in said direction and said magnitude for each of said incidence vectors;

310 applying said normalization function 41 to the captured image 38 thereby producing a normalized image 40.

Figure 9:
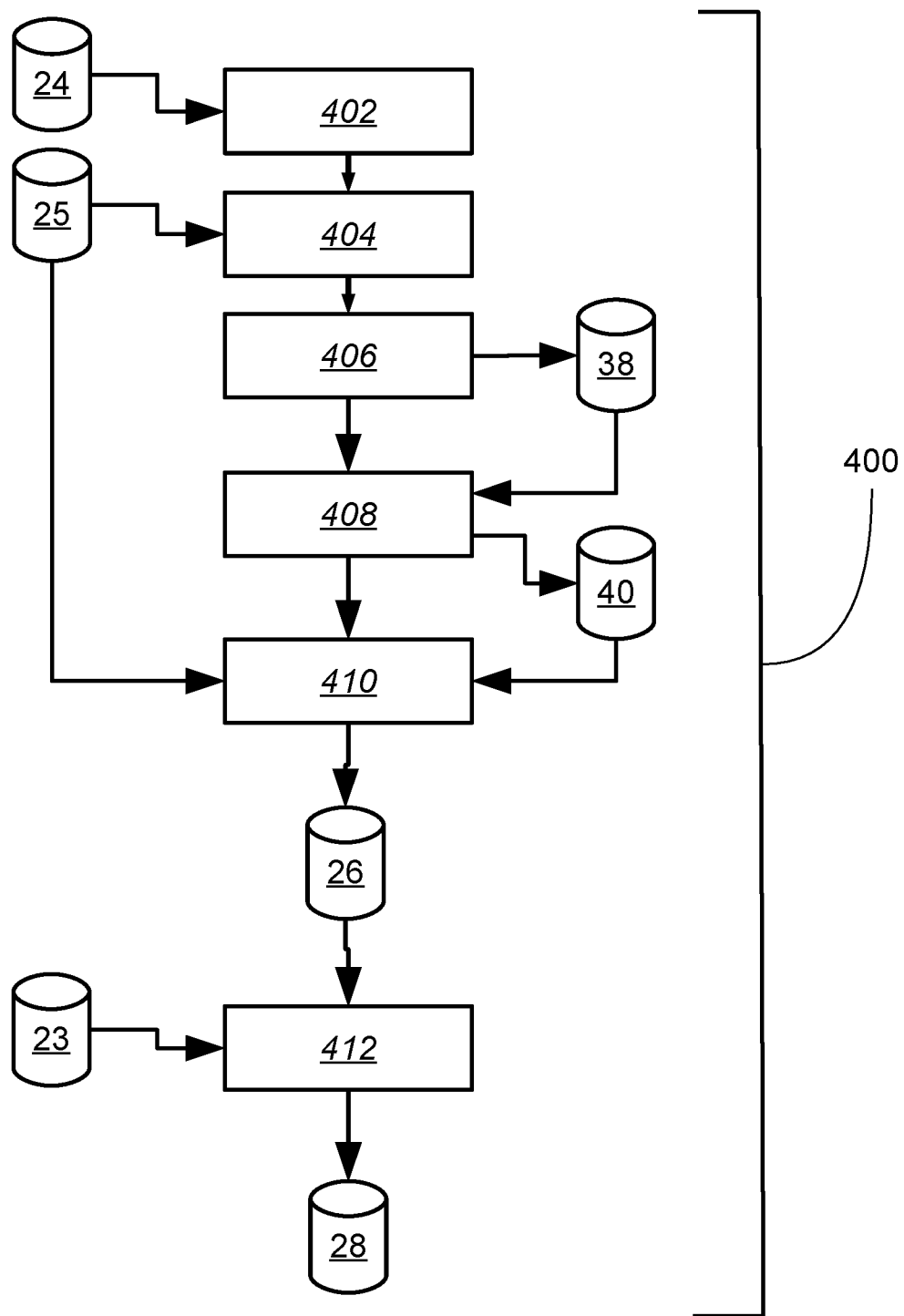
FIG. 9 is a schematic flowchart of a process for calibrating a display.

FIG. 9 shows a flowchart of a process 400 of calibrating a display that may be carried out by the in-situ display monitoring and calibration system. Process 400 comprises the steps of:

402 displaying a calibration pattern 24 on the viewing plane of a display;

404 associating an expected image 25 with said calibration pattern, said expected image comprising brightness and color information for each light emitting element comprising the viewing plane;

406 triggering an image acquisition system to acquire a captured image 38 of said viewing plane;

408 creating a normalized image 40 from said captured image;

410 forming a calibration data set 26 comprising the color and brightness differences between said expected image and said normalized image;

412 producing visual media rendered on the viewing plane of the display 28 by applying, in a display control system, said calibration data set 26 to the rendering of visual media 23 upon the viewing plane of said display such that the differences between said normalized image 40 and said expected image 25 are reduced.

Turning now to FIG. 10A, shown is a perspective view of an in-situ display monitoring and calibration system 2 with a calibration image 24 displayed on viewing plane 80 of display 4. The system is shown comprising a first image acquisition system 30*a* and a second image acquisition system 30*b* which collectively image the entire viewing plane. Both image acquisition systems are shown in deployed position 33. The display is shown having four geometric features G1, G2, G3, and G4. FIG. 10B shows a first captured image 38*a* which may be captured by first image acquisition system 30*a* of FIG. 10A. Geometric features F1 and F4 are visible in first captured image 38*a* and they correspond to geometric features G1 and G4, respectively, shown in FIG. 10A. FIG. 10C shows a second captured image 38*b* which may be captured by second image acquisition system 30*b* of FIG. 10A. Geometric features F2 and F3 are visible in second captured image 38*b* and they correspond to geometric features G2 and G3, respectively, shown in FIG. 10A. Display control system 6 is operable to: actuate both image acquisition systems between deployed 33 and stored positions; render one or more calibration patterns 24 on viewing plane 80 and trigger the capture of first and second image acquisition systems.

The display control system 6 of FIG. 10A may also be operable to: associate a first expected image received by first image acquisition system 30*a* with a portion of calibration pattern 24, associate a second expected image received by second image acquisition system 30*b* with a portion of calibration pattern 24; produce the first normalized image from first captured image; produce a second normalized image from the second capture image; produce a first calibration data set by comparing first normalized image to first expected image; produce a second calibration data set by comparing second normalized image to second expected image; combine first and second calibration data sets to creating a composite calibration data set that comprises brightness and color corrections for each light emitting element comprising the viewing plane.

Embodiments like that disclosed in FIG. 10A may use a plurality of image acquisition systems to capture images of different portions of a display screen, thereby collectively imaging the entire display. Other embodiments may use a single image capture system that is moved to different positions in order to capture images of different portions of the display, the overall effect being to collectively image the entire display while using just one image capture system.

Although the present invention has been described in considerable detail with reference to certain preferred versions thereof, other versions are possible. It may be desirable to combine features shown in various embodiments into a single embodiment. A different number and configuration of features may be used to construct embodiments of the apparatus and systems that are entirely within the spirit and scope of the present disclosure. Therefore, the spirit and scope of the appended claims should not be limited to the description of the preferred versions contained herein.

Any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" in the claims herein is not intended to invoke the provisions of 35 U.S.C. Section 112, Paragraph 6.

What is claimed is:

1. A display system comprising:
   a plurality of light emitting elements arranged in a predetermined pattern, the plurality of light emitting elements forming a viewing plane;
   a display control subsystem configured to display a calibration pattern on the viewing plane and comprising, for each of the plurality of light emitting elements, a first data set defining a surface normal vector and a second data set defining an incidence vector, the display control subsystem storing instructions that, when executed, cause the display system to:
      capture a first image of the viewing plane, the first image having a first position and a first orientation;
      capture a second image of the viewing plane, the second image having a second position and a second orientation;
      normalize the first image and the second image using a plurality of data sets indicative of an expected image;
      determine one or more differences in characteristics between: (i) the normalized first image and the expected image, or (ii) the normalized second image and the expected image; and
      apply adjustments to the viewing plane to correct the one or more differences.

2. The display system of claim 1, further comprising a first image acquisition subsystem having a plurality of light receiving elements forming a first imaging plane, the first image acquisition subsystem configured to capture the first image of the viewing plane from the first position and the first orientation.

3. The display system of claim 2, further comprising a linking coupled to the first image acquisition subsystem, the linking having (i) a deployed position corresponding to the first position and the first orientation, and (ii) a stored position to protect the first imaging plane.

4. The display system of claim 1, further comprising a second image acquisition subsystem having a plurality of light receiving elements forming a second imaging plane, the second image acquisition subsystem configured to capture the second image of the viewing plane from the second position and the second orientation.

5. The display system of claim 1, wherein
   the surface normal vector is originating at each light emitting element and directed perpendicular to the viewing plane;
   each incidence vector is originating at each light emitting element and directed at the first position or the second position; and
   the display control subsystem further comprises a third data set defining, for each of the plurality of light emitting elements, a first luminous output corresponding to the surface normal vector, a second luminous output corresponding to the incidence vector, and a known relationship to link the first luminous output with the second luminous output.

6. The display system of claim 1, wherein the one or more differences in characteristics include one of color differences or brightness differences.

7. The display system of claim 1, wherein the display control subsystem is configured to store a predetermined time-of-day to display the calibration pattern on the viewing plane.

8. A display calibration method comprising:
   displaying, by a display control subsystem, a calibration pattern on a viewing plane, the viewing plane comprising a plurality of light emitting elements arranged in a predetermined pattern, the display control subsystem comprising, for each of the plurality of light emitting elements, a first data set defining a surface normal vector and a second data set defining an incidence vector;
   capturing a first image of the viewing plane, the first image having a first position and a first orientation;
   capturing a second image of the viewing plane, the second image having a second position and a second orientation;
   normalizing the first image and the second image using a plurality of data sets indicative of an expected image;
   determining one or more differences in characteristics between: (i) the normalized first image and the expected image, or (ii) the normalized second image and the expected image; and
   applying adjustments to the viewing plane to correct the one or more differences.

9. The display calibration method of claim 8, wherein the capturing the first image is performed by a first image acquisition subsystem having a plurality of light receiving elements forming a first imaging plane, the first image acquisition subsystem configured to capture the first image of the viewing plane from the first position and the first orientation.

10. The display calibration method of claim 9, further comprising:
    transitioning the first image acquisition subsystem from a stored position to a deployed position corresponding to the first position and the first orientation.

11. The display calibration method of claim 8, wherein the capturing the second image is performed by a second image acquisition subsystem having a plurality of light receiving elements forming a second imaging plane, the second image acquisition subsystem configured to capture the second image of the viewing plane from the second position and the second orientation.

12. The display calibration method of claim 8, wherein
    the surface normal vector is originating at each light emitting element and directed perpendicular to the viewing plane;
    each incidence vector is originating at each light emitting element and directed at the first position or the second position; and
    the display control subsystem further comprises a third data set defining, for each of the plurality of light emitting elements, a first luminous output corresponding to the surface normal vector, a second luminous output corresponding to the incidence vector, and a known relationship to link the first luminous output with the second luminous output.

13. The display calibration method of claim 8, wherein the one or more differences in characteristics include one of color differences or brightness differences.

14. The display calibration method of claim 8, wherein the display control subsystem is configured to store a predetermined time-of-day to display the calibration pattern on the viewing plane.

15. A display calibration system, comprising:
- a plurality of light emitting elements arranged in a predetermined pattern, the plurality of light emitting elements forming a viewing plane;
- a first image acquisition subsystem having a plurality of light receiving elements forming a first imaging plane, the first image acquisition subsystem configured to capture a first image of the viewing plane from a first position and a first orientation;
- a second image acquisition subsystem having a plurality of light receiving elements forming a second imaging plane, the second image acquisition subsystem configured to capture a second image of the viewing plane from a second position and a second orientation;
- a linking coupled to the first image acquisition subsystem, the linking having (i) a deployed position corresponding to the first position and the first orientation, and (ii) a stored position to protect the first imaging plane; and
- a display control subsystem configured to display a calibration pattern on the viewing plane, wherein the display control subsystem stores instructions that, when executed, cause the display calibration system to:
- capture the first image of the viewing plane;
- capture the second image of the viewing plane;
- normalize the first image and the second image using a plurality of data sets indicative of an expected image;
- determine one or more differences in characteristics between: (i) the normalized first image and the expected image, or (ii) the normalized second image and the expected image; and
- apply adjustments to the viewing plane to correct the one or more differences.

16. The display calibration system of claim 15, wherein the display control subsystem further comprises:
- a first data set defining a surface normal vector for each of the plurality of light emitting elements, the surface normal vector originating at each light emitting element and directed perpendicular to the viewing plane;
- a second data set defining an incidence vector for each of the plurality of light emitting elements, each incidence vector originating at each light emitting element and directed at the first position or the second position; and
- a third data set defining, for each of the plurality of light emitting elements, a first luminous output corresponding to the surface normal vector, a second luminous output corresponding to the incidence vector, and a known relationship to link the first luminous output with the second luminous output.

17. The display calibration system of claim 15, wherein the one or more differences in characteristics include one of color differences or brightness differences.

18. The display calibration system of claim 15, wherein the instructions further cause the display calibration system to:
- prior to capturing the first image, transition, by the linking, the first image acquisition subsystem from the stored position to the deployed position.

19. The display calibration system of claim 18, wherein the display control subsystem is configured to store a predetermined time-of-day to display the calibration pattern on the viewing plane, and the transition of the first image acquisition subsystem from the stored position and the deployed position occurs automatically responsive to the display of the calibration pattern at the predetermined time-of-day.

* * * * *